Figure 1:
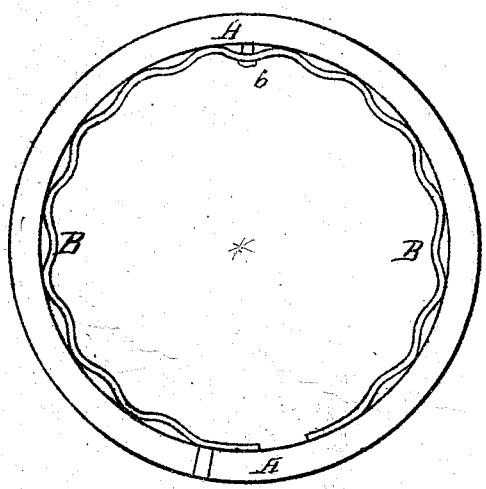
Figure 2:
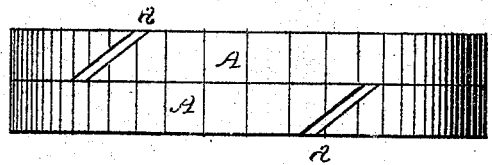

D. H. FAIRBANKS.

Improvement in Metallic Piston-Packing.

No. 131,817. Patented Oct. 1, 1872.

Witnesses
H. L. Coombs.
T. M. Coombs

Inventor
Dexter H. Fairbanks
by C. L. Coombs
Atty.

UNITED STATES PATENT OFFICE.

DEXTER H. FAIRBANKS, OF SOUTH NORWALK, CONNECTICUT.

IMPROVEMENT IN METALLIC PISTON-PACKINGS.

Specification forming part of Letters Patent No. 131,817, dated October 1, 1872.

*To all whom it may concern:*

Be it known that I, DEXTER H. FAIRBANKS, of South Norwalk, county of Fairfield, State of Connecticut, have invented certain Improvements in Metallic Packing, or packing-rings for the pistons of engines, pumps, or other similar machines, of which the following is a specification:

My invention relates to an improvement upon the metallic packing or packing-rings used upon the pistons of engines, pumps, and other machines, whereby the durability of such packing is increased, and the rings made to fit the interior of the cylinder more accurately and wear more evenly than is the case in the metallic packing as ordinarily constructed. My invention consists of a corrugated circular spring, of steel or other elastic metal or material, in combination with the ordinary split metal rings ordinarily used for the pistons of engines, pumps, &c. The springs heretofore used to distend such packing-rings have been very defective in their action, and have cut or worn the rings very rapidly, rendering them useless in a short time. This is owing to the fact that such springs have had but one, or at most two, bearing-surfaces against the inside of the rings, where the whole force of the spring is exerted, causing the spring to cut the rings very rapidly at such points. By the use of the corrugated spring all these defects are obviated, the corrugations forming a large number of broad bearing-surfaces, which distribute the force of the spring uniformly over the entire inside surface of the rings.

In the drawing, A A represent two elastic metallic packing-rings, divided, as shown at *a*, and arranged side by side, so as to "break joints," as in the ordinary packing. Within said rings is a circular corrugated spring, B, secured by means of a small pin or bolt, *b*, or in any other convenient manner.

The spring is made of steel or any other suitable elastic metal or material, of sufficient size and power to distend the rings and cause them to fill the cylinder when the piston is in place.

The rings and spring are secured to the piston in the ordinary manner familiar to all engineers.

What I claim is—

The single corrugated spring B, in combination with the packing-rings of a piston, as and for the purposes described.

DEXTER H. FAIRBANKS.

Witnesses:
JOHN B. BOUTON,
FRANCIS F. BYXBEE.